Patented Mar. 25, 1952

2,590,141

UNITED STATES PATENT OFFICE 2,590,141

PREPARATION OF CRYSTALLINE DIHYDRO-STREPTOMYCIN SULFATE

Frank J. Wolf, Westfield, N. J., assignor to Merck & Co., Inc., Rahway, N. J., a corporation of New Jersey No Drawing. Application April 6, 1949, Serial No. 85,946

10 Claims. (Cl. 260—210)

This application is a continuation-in-part of my pending application Serial No. 70,807, filed January 13, 1949.

This invention relates to a new superior clinical form of dihydrostreptomycin and to methods for preparing the same. More particularly, the invention relates to crystalline dihydrostreptomycin sulfate, and to procedures for preparing the same from amorphous dihydrostreptomycin sulfate and by metathesis from other acid salts of dihydrostreptomycin.

While the therapeutic value of dihydrostreptomycin sulfate has been recognized for some time, difficulty has been experienced in obtaining a pure product. The methods heretofore available comprised obtaining dihydrostreptomycin sulfate either by freeze-drying of an aqueous solution, or by precipitating the product in amorphous form from aqueous solutions by the addition of a miscible solvent such as methanol or acetone. The products thus obtained are amorphous and contain impurities, the last traces of which are virtually impossible to remove. Additionally, these processes for recovering dihydrostreptomycin sulfate are relatively expensive.

When the freeze-drying procedure is used, all of the impurities contained in the aqueous solution are found in the dried product. Similarly, in obtaining the product by precipitation, the amorphous product occludes impurities, and/or the impurities are of such a nature that they are co-precpitated along with the desired product.

Also, these processes are relatively uneconomical. The freeze-drying process requires expensive equipment and is relatively expensive to operate, since it requires the use of extremely low temperatures and high vacuum. Similarly, the process involving precipitation of the dihydrostreptomycin sulfate with a miscible solvent such as acetone or methanol is relatively expensive, since it involves the use of large quantities of organic solvents which must be handled and recovered from the aqueous mother liquors.

Therefore, it was evident to all workers in this field that in order to prepare pure dihydrostreptomycin sulfate, it would be extremely desirable to obtain the product in crystalline form. It has heretofore been impossible, however, to prepare dihydrostreptomycin sulfate in crystalline form.

In accordance with one embodiment of my invention, I have now discovered that it is possible under certain controlled conditions to crystallize dihydrostreptomycin sulfate and so obtain the product in pure form. After crystals of this product are available, it is possible to utilize such crystals to seed other solutions of dihydrostreptomycin sulfate under proper conditions to obtain crystals of the product.

The pure crystalline product thus obtained is a superior product for clinical injection and produces none of the toxic effects, manifested in pain following injection, which are normally experienced with available streptomycin and dihydrostreptomycin preparations.

I have found that it is possible to obtain crystalline dihydrostreptomycin sulfate from an aqueous solution made up with amorphous dihydrostreptomycin sulfate and having a pH of about 4.5 by diluting said solution with a lower aliphatic alcohol, preferably methanol, until a slight permanent turbidity remains. This turbid solution is then permitted to stand until the dihydrostreptomycin sulfate crystallizes, which usually occurs within about 24 hours. As indicated previously, methanol is the preferred solvent for effecting this crystallization, although other lower aliphatic alcohols miscible with water, such as ethanol and isopropanol can also be used for this purpose.

For optimum results, it is desirable to have the aqueous dihydrostreptomycin sulfate solution at a pH of about 4.5, although crystals are obtainable within the pH range of 4 to 5.5. The pH of the solution is advantageously adjusted by the addition of the requisite amount of dilute sulfuric acid.

It is correspondingly possible to obtain the crystalline product from aqueous solutions containing 0.1 to 60% dihydrostreptomycin sulfate by the use of methanol at varying concentrations. For example, with a 0.1% solution of dihydrostreptomycin sulfate, 6 volumes (approximately 83%) of methanol was used, whereas with a 60% solution about 0.3 volume (approximately 23%) methanol is necessary. The relationship is, therefore, apparent that as the solution of dihydrostreptomycin sulfate is more concentrated smaller relative amounts of solvent are required to produce turbidity. It should be further noted that as crystallization of dihydrostreptomycin sulfate progresses, it is necessary, if maximum recovery of crystalline products is desired, to add more solvent from time to time to maintain the solution supersaturated with respect to dihydrostreptomycin sulfate.

The crystalline dihydrostreptomycin sulfate crystallized in accordance with my invention can be readily recovered in pure solid form by filtering or centrifuging, washing the solid product with an aqueous lower alcoholic solution, and drying the solid product. In this connection, it should be noted that the crystalline dihydrostreptomycin sulfate so obtained is a pure product which possesses physical properties different than those ascribed to the amorphous product. For example, while both crystalline and amorphous dihydrostreptomycin sulfate are very soluble in water, the crystalline form is 50 to 100 times less soluble than the amorphous form in 50% aqueous methanol. This marked difference in solubility is also exhibited in other aqueous-organic solvent mixtures.

It will be realized by those skilled in the art that by seeding with a few crystals of the given product, it is often possible to induce substances to crystallize from solution which otherwise will not do so. Thus, with crystals of dihydrostreptomycin sulfate available, it is possible to employ these crystals as seeds for inducing a crystallization of dihydrostreptomycin sulfate from solutions which under ordinary circumstances would not deposit the crystalline product. For example, although I have not been able to obtain crystalline dihydrostreptomycin sulfate from aqueous solutions thereof diluted with acetone, the addition of a small quantity of the crystalline form will induce the crystallization of the dihydrostreptomycin sulfate from such aqueous acetone solutions.

Solvents suitable for inducing crystallization of dihydrostreptomycin sulfate from aqueous solution when seed crystals are available include acetone and water miscible solvents in which the solubility of dihydrostreptomycin sulfate is at least as great as in acetone, as for example, ethanol, isopropanol and ethylene glycol.

The amount of organic solvent to employ varies with the concentration of dihydrostreptomycin sulfate in the aqueous solution, but may be generally referred to as the amount required to form a slightly supersaturated solution. With some solvents, notably acetone and the lower alkyl alcohols, the appearance of a faint turbidity in the solution indicates when the proper degree of supersaturation has been reached. Addition of too much solvent will cause precipitation of the sulfate in amorphous form, but such a precipitate can readily be redissolved by adding water to compensate for the excess solvent present. Since redissolving the undesired amorphous precipitate is time consuming, and hence objectionable in large scale production, it is preferable to test a small sample of solution with the selected solvent to ascertain the maximum amount of solvent that can be added without precipitating amorphous sulfate, and then to add to the batch an amount of solvent equal to about 90% of the maximum amount thus determined.

No matter what solvent is employed, it is necessary if maximum recovery of crystalline product is desired to add additional solvent from time to time during the crystallization to maintain the solution in a supersaturated state with respect to dihydrostreptomycin sulfate.

The starting solution of dihydrostreptomycin sulfate can be prepared by merely dissolving in water amorphous dihydrostreptomycin sulfate obtained either by hydrogenation of other streptomycin salts such as the hydrochloride, and subsequent conversion of the corresponding dihydrostreptomycin salt to the sulfate, or by preparing streptomycin sulfate from other salts such as the hydrochloride and subsequently hydrogenating to hydrostreptomycin sulfate. If the dihydrostreptomycin sulfate is obtained in processing as an aqueous solution, this may be used directly without intermediate separation of solid amorphous product.

Alternatively, the solution of dihydrostreptomycin sulfate may be formed in situ by a metathetical reaction between another salt of dihydrostreptomycin and a sulfuric acid salt. Any salt of dihydrostreptomycin having moderate solubility in the aqueous solvent mixture used for crystallization may be employed, as for example the acetate, formate, nitrate, hydrobromide, hydrochloride and tartrate salts of dihydrostreptomycin. The primary requirement with respect to the sulfuric acid salt employed is that both the sulfuric acid salt, and the reaction product of the cation of said salt with the anion of the starting dihydrostreptomycin acid salt, be more soluble than dihydrostreptomycin sulfate in the solvent mixture employed. Suitable sulfuric acid salts include ammonium sulfate, alkyl amine sulfates such as dimethylamine sulfate, and alkylol amine sulfates such as triethanolamine sulfate. As a practical matter, however, upon the basis of ease of preparation and availability, the hydrochloride salt of dihydrostreptomycin and ammonium sulfate are probably the most useful compounds to employ in this metathesis reaction.

In the metathesis, the low solubility of crystalline dihydrostreptomycin sulfate in the aqueous-organic solvent mixture acts as a driving force carrying the reaction in the desired direction by removing dihydrostreptomycin sulfate from the reaction mixture as it is formed. When an aqueous lower alkyl alcohol, and particularly aqueous methanol, is used in the metathesis, crystals can be obtained directly without seeding. It is desirable even with these solvents, however, to seed the reaction mixture in order to insure a satisfactory rate of crystallization.

It has been found that after a number of crystallizations of dihydrostreptomycin sulfate have been carried out in a particular environment, crystallization of additional amounts of dihydrostreptomycin sulfate can sometimes be effected without the actual addition of seed crystals. This is probably due to the presence in the apparatus or atmosphere of minute crystals of dihydrostreptomycin sulfate. In order to provide optimum control of the crystallization and to effect crystallization in the shortest time, it is preferable, however, to add crystals to the supersaturated solution rather than to rely on the seeding action of minute crystals in the environment.

It will be understood that both the metathesis and the crystallization of dihydrostreptomycin sulfate from aqueous solutions prepared from amorphous product can be carried out under sterile conditions, in which event, the crystalline product can be recovered directly in a form suitable for clinical use.

The pure crystalline product thus obtained in accordance with my invention is a superior product for clinical injection, and produces none of the toxic effects, manifested in pain following injection, which are normally experienced with available streptomycin and dihydrostreptomycin preparations. Thus, when samples of amorphous dihydrostreptomycin sulfate and the corresponding crystalline salt are compared by the rabbit irritation test, it is found that the amorphous product is more than three times as irritating as the corresponding crystalline product.

The pharmacological advantage of reduced toxicity in the resulting crystalline dihydrostreptomycin sulfate is probably due in large part to the high purity of the product, since the amorphous salt obtained from the crystalline sulfate is likewise non-toxic. In the crystallization procedures, impurities such as the sulfate salts of streptomycin, mannisidostreptomycin and dihydromannisidostreptomycin do not crystallize under the conditions used for the crystallization of dihydrostreptomycin sulfate. In addition, other impurities and decomposition products are soluble in the solvent mixture and are consequently removed from the crystalline product.

In addition to providing an improved clinical form of dihydrostreptomycin in the crystalline product, the crystallization procedures represent a major improvement over existing methods for recovering amorphous product, particularly in eliminating the necessity of removing large quantities of water by costly procedures of freeze-drying or low temperature evaporation.

It should further be noted that the crystalline form of dihydrostreptomycin sulfate is particularly advantageous, since it permits easier handling and packaging of the final product. Since the activity of the crystalline form is always constant, it is not necessary to bioassay the material prior to packaging as is the case with the amorphous material previously available.

The X-ray diffraction pattern of a sample of crystalline dihydrostreptomycin sulfate is tabulated below indicating the spacings and relative intensities as measured by a "Norelco" Geiger-counter spectrometer.

*X-ray diffraction*

| Spacing, Å. | Relative Intensity, Percent |
|---|---|
| 8.74 | 50 |
| 8.09 | 35 |
| 7.64 | 40 |
| 6.81 | 35 |
| 6.32 | 25 |
| 5.62 | 40 |
| 5.35 | 60 |
| 4.78 | 85 |
| 4.70 | 85 |
| 4.32 | 60 |
| 4.13 | 50 |
| 4.07 | 45 |
| 3.81 | 30 |
| 3.69 | 50 |
| 3.62 | 75 |
| 3.42 | 100 |
| 3.19 | 25 |
| 3.14 | 40 |
| 2.95 | 25 |

The other crystalline characteristics are as follows:

Refractive indices $\alpha = 1.552 \pm .002$
$\beta = 1.558 \pm .004$
$\gamma = 1.566 \pm .002$ Extinction angle 18°.

Crystals of dihydrostreptomycin sulfate are characteristically formed as thin, white, irregular shaped platelets which often occur in clusters.

The following examples show how procedures for the preparation of crystalline dihydrostreptomycin sulfate in accordance with the present invention can be carried out, but it is to be understood that these examples are given by way of illustration and not of limitation.

*Example 1*

A sample of highly purified but amorphous dihydrostreptomycin sulfate was dissolved in water and the pH of the solution adjusted to pH 4.5 by adding a small amount of dilute sulfuric acid. The volume of the resultant solution was adjusted in such a fashion that 20 g. of the product was dissolved in 100 cc. of solution. Part of the master solution was then diluted to produce solutions containing 10, 5, 2 and 1 g. per 100 cc. A small sample of each of these solutions was diluted in a test tube with methanol until turbid and set aside. A second set was prepared and diluted with acetone. After about eight hours had elapsed, all tubes were scratched. Twenty-four hours later, all of the tubes containing methanol contained crystalline dihydrostreptomycin sulfate.

Analysis: Calcd: C, 34.42; H, 6.05; N, 13.38; S, 6.56. Found: C, 34.26; H, 6.32; N, 13.27; S, 6.59.

*Example 2*

To a solution of 20 g. of dihydrostreptomycin hydrochloride and 6.5 g. of ammonium sulfate in 100 cc. of water was added 100 cc. of methanol. The resulting clear solution was stirred gently overnight during which time crystalline dihydrostreptomycin sulfate separated. A second 100 cc. portion of methanol was added and the mixture stirred for four hours. The product was filtered, washed, with 50–50 methanol-water, methanol and dried at 100° in vacuo, wt. 20 g.

*Example 3*

A solution of 60 g. of amorphous dihydrostreptomycin sulfate was adjusted to pH 4.5 with dilute sulfuric acid, and the volume adjusted to 300 cc. Methanol was added to the solution until a faint turbidity persisted (175 cc. was required). One gram of crystalline dihydrostreptomycin sulfate was then added and the mixture was stirred four hours, during which time crystalline dihydrostreptomycin sulfate separated from the solution. At this time a sample of the supernatant liquid was removed and methanol was added until a faint turbidity existed. This required 34% of its volume of methanol indicating that 160 cc. of methanol could be added without precipitating amorphous dihydrostreptomycin sulfate. To the mixture was added 140 cc. of methanol (about 90% of the tolerance), and stirring continued at room temperature for 18 hours. At the end of this time a sample of the supernatant liquor was removed and evaporated to dryness. The weight obtained, 1.7 mg. per cc., indicated that 0.95 g. or 1.6% of the original solid remained in the mother liquor. The mixture was filtered and the product washed on the funnel with one 100 cc. portion of 50–50 methanol-water and five 100 cc. portions of methanol, and dried in vacuo. The weight of product obtained was 58 g.

The concentrations cited in the foregoing example are not critical. It will be understood that by varying the concentration of dihydrostreptomycin sulfate in water and the proportion of methanol added that equally high yields of crystalline product may be obtained under a wide range of conditions. The primary factor to bear in mind is that the amount of methanol should not exceed the amount necessary to produce a faint turbidity. This amount will, of course, vary with each batch depending upon the actual concentration of dihydrostreptomycin sulfate in the starting solution.

The foregoing procedure has been repeated using as solvent each of the following: isopropanol, ethanol and acetone. Different amounts of these solvents are, of course, necessary to bring the solution to supersaturation (or turbidity), but in each instance seeding and permitting the solution to stand with agitation resulted in good yields of crystalline product.

*Example 4*

$2C_{21}H_{41}O_{12}N_7.3HCl + 3[(HOCH_2CH_2)_3N]_2.H_2SO_4 +$
seed crystals $\rightarrow (C_{21}H_{41}O_{12}N_7)_2.3H_2SO_4 +$
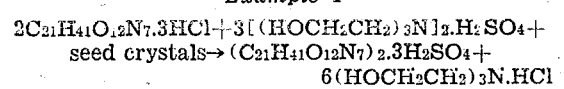

To a solution of triethanolamine in methanol was added sulfuric acid to a pH of about 4.5. The resultant solution contained about 0.1 equivalent of triethanolamine sulfate per 100 cc.

To a solution of 90.5 g. of dihydrostreptomycin hydrochloride in 460 cc. of water was added 143 cc. of triethanolamine sulfate solution. The mixture was seeded with crystalline dihydrostreptomycin sulfate and 200 ml. of methanol was added. The mixture was stirred for forty-eight hours and an additional 286 cc. of the triethanolamine sulfate was added. The mixture was stirred an additional 48 hours and filtered and washed with methanol. The dried product, crystalline dihydrostreptomycin sulfate, weighed 80.5 g.

*Example 5*

A water solution of dihydrostreptomycin hydrochloride was prepared by reducing streptomycin calcium chloride double salt in water solution with hydrogen in the presence of Adam's catalyst (platinum oxide), filtering from the catalyst, treating the resultant solution with silver carbonate to effect removal of calcium chloride and filtering from the resultant silver chloride, calcium carbonate mixture. The solution obtained was adjusted to pH 4.5 with hydrochloric acid. A total solids assay indicated a concentration of 377 mg. of dihydrostreptomycin hydrochloride per cc. of solution.

A water solution of triethanolamine sulfate was prepared by adding a 50% water solution of sulfuric acid to a 50% water solution of triethanolamine. The resultant solution contained 2.2 equivalents per liter.

To 300 cc. of the dihydrostreptomycin solution containing 113 g. (0.163 mole) of dihydrostreptomycin hydrochloride was added 250 cc. of triethanolamine sulfate solution containing 0.55 equivalents of triethanolamine (3.37 equivalents per mole of dihydrostreptomycin) and 540 cc. of methanol. The mixture was seeded with crystalline dihydrostreptomycin sulfate and allowed to stir for four hours. A sample of the supernatant liquor was removed and was found to tolerate 62% of its volume of methanol before becoming turbid. Six hundred cc. of methanol (89% of the tolerated volume) was added and stirring continued for an additional twelve hours. At the end of this time an optical rotation of the supernatant liquor indicated that the residual concentration of dihydrostreptomycin was 1.7 mg. per cc. or a crystallization yield of 97.5%. The product was filtered, washed with 50-50 methanol-water, then methanol and dried. The weight of product obtained was 119.6 g. or 360 mg. per cc. of starting solution.

*Example 6*

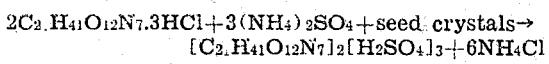

The rich liquor of dihydrostreptomycin hydrochloride after the silver carbonate treatment step as shown in Example 5, is adjusted to pH 4.5-4.7 and 30.0 g. of ammonium sulfate per 100 g. of dihydrostreptomycin hydrochloride is added to the solution. After the ammonium sulfate has dissolved, the solution is treated with activated charcoal. After filtration the volume of the filtrate is adjusted with water to the concentration of 200 mg. of dihydrostreptomycin hydrochloride per cc. of solution. Methanol is added gradually to the mixture until a faint turbidity remains, usually requiring an equal volume of solvent. Seed crystals of dihydrostreptomycin sulfate are added in the amount of 2% of the weight of the dihydrostreptomycin charged. The mixture is stirred for six to eight hours. Methanol is added until the total volume of methanol added is equal to 1½ times the volume of the 20% aqueous solution. The crystallized dihydrostreptomycin sulfate is removed by centrifugation and washed with a 50-50 methanol-water solution followed by a methanol wash. The product is dried in vacuo at 60° C.

*Example 7*

As described in Example 5, the procedure was repeated using 5,370 cc. of the dihydrostreptomycin hydrochloride solution and 4,120 cc. of a triethanolamine sulfate solution containing 10.5 equivalents of triethanolamine sulfate (3.72 equivalents per mole of dihydrostreptomycin). A total of 19 liters of methanol was added in two equal parts. The product was filtered on a basket centrifuge and washed with 4 liters of 50-50 methanol-water and 4 liters of methanol and dried. The weight of product, 2,130 g., corresponds to 376 mg. per cc. of the original starting solution. Correcting for 5% volatile constituents, the yield is 93% based on the original total solids assay of the solution.

This procedure is also amenable to the preparation of sterile crystalline dihydrostreptomycin sulfate providing the proper precautions are taken in handling the solutions and the product. The preparation of crystalline dihydrostreptomycin sulfate of high purity is thus possible directly from streptomycin calcium chloride double salt by using only three steps, namely, reduction; removal of calcium chloride; and crystallization.

It will also be understood that the concentrations of dihydrostreptomycin in water and methanol may be varied within wide limits without seriously affecting the practical operation of the procedure.

*Example 8*

A solution of 20 g. of dihydrostreptomycin hydrochloride in 100 cc. of water was prepared. To the solution was added 8 g. of dimethylamine and the solution immediately neutralized to pH 4.7 with sulfuric acid. The solution was diluted with methanol until turbid (110 cc. required), seeded with crystalline dihydrostreptomycin sulfate and stirred. After 12 hours an additional 110 cc. portion of methanol was added. Four hours later the clear supernatant liquor was assayed indicating greater than 90% crystallization. The product was filtered, washed with 80% methanol-20% water then methanol and dried in vacuo. Weight, 19-20 g. (90-95% yield).

Various changes and modifications in the foregoing procedures will occur to those versed in the art, and to the extent that such changes and modifications are embraced by the appended claims, it is to be understood that they constitute part of my invention.

I claim:

1. The process for producing crystalline dihydrostreptomycin sulfate that comprises preparing an aqueous methanol solution containing dihydrostreptomycin hydrochloride and ammonium sulfate and having a pH of about 4.5, adjusting the concentration of methanol to an amount merely sufficient to produce a faint turbidity in the solution, and allowing the solution to stand with stirring for crystallization of dihydrostreptomycin sulfate therefrom.

2. The process that comprises preparing an aqueous solution containing dihydrostreptomycin sulfate and a water miscible organic solvent in which the solubility of dihydrostreptomycin sulfate is at least as great as in acetone and having a pH of about 4.5, said dihydrostreptomycin sulfate being formed in situ by reaction between an acid salt of dihydrostreptomycin which is more soluble than dihydrostreptomycin sulfate in the solvent mixture employed, and a sulfuric acid salt selected from the group consisting of ammonium sulfate and sulfuric acid salts of alkyl and alkylol amines which are more soluble than dihydrostreptomycin sulfate in the solvent mixture, adjusting the concentration of said organic solvent to an amount sufficient to produce a supersaturated solution, exposing the solution to seed crystals of dihydrostreptomycin sulfate, and allowing the solution to stand for crystallization of dihydrostreptomycin sulfate therefrom.

3. The process that comprises preparing an aqueous solution containing dihydrostreptomycin sulfate and a water miscible organic solvent in which the solubility of dihydrostreptomycin sulfate is at least as great as in acetone and having a pH of about 4.5, said dihydrostreptomycin sulfate being formed in situ by reaction between an acid salt of dihydrostreptomycin which is more soluble than dihydrostreptomycin sulfate in the solvent mixture employed, and a sulfuric acid salt selected from the group consisting of ammonium sulfate and sulfuric acid salts of alkyl and alkylol amines which are more soluble than dihydrostreptomycin sulfate in the solvent mixture, adjusting the concentration of said organic solvent to an amount sufficient to produce a supersaturated solution, exposing the solution to seed crystals of dihydrostreptomycin sulfate, allowing the solution to stand for crystallization of dihydrostreptomycin sulfate therefrom, and adding additional organic solvent during crystallization to maintain said solution in a supersaturated condition.

4. The process that comprises preparing an aqueous solution containing dihydrostreptomycin sulfate and methanol and having a pH of about 4.5, said dihydrostreptomycin sulfate being formed in situ by reaction between an acid salt of dihydrostreptomycin which is more soluble than dihydrostreptomycin sulfate in the solvent mixture employed and a sulfuric acid salt selected from the group consisting of ammonium sulfate and sulfuric acid salts of alkyl and alkylol amines which are more soluble than dihydrostreptomycin sulfate in the solvent mixture, adjusting the concentration of methanol to an amount merely sufficient to produce a faint turbidity in the solution, exposing the solution to seed crystals of dihydrostreptomycin sulfate, and allowing the solution to stand for crystallization of dihydrostreptomycin sulfate therefrom.

5. The process for producing crystalline dihydrostreptomycin sulfate that comprises preparing an aqueous methanol solution containing dihydrostreptomycin hydrochloride and a sulfuric acid salt selected from the group consisting of ammonium sulfate and sulfuric acid salts of alkyl and alkylol amines which are more soluble than dihydrostreptomycin sulfate in the aqueous methanol solution, and having a pH of about 4.5, adjusting the concentration of methanol to an amount merely sufficient to produce a faint turbidity in the solution, exposing the turbid solution to seed crystals of dihydrostreptomycin sulfate, and allowing the solution to stand for crystallization of dihydrostreptomycin sulfate therefrom.

6. The process for producing crystalline dihydrostreptomycin sulfate that comprises preparing an aqueous solution containing dihydrostreptomycin hydrochloride, triethanolamine sulfate, and methanol, and having a pH of about 4.5, adjusting the concentration of methanol in said solution to an amount merely sufficient to produce a faint turbidity in the solution, exposing the turbid solution to seed crystals of dihydrostreptomycin sulfate, and allowing the solution to stand for crystallization of dihydrostreptomycin sulfate therefrom.

7. The process for producing crystalline dihydrostreptomycin sulfate that comprises preparing an aqueous solution containing dihydrostreptomycin hydrochloride, dimethylamine sulfate, and methanol, and having a pH of about 4.5, adjusting the concentration of methanol in said solution to an amount merely sufficient to produce a faint turbidity in the solution, exposing the turbid solution to seed crystals of dihydrostreptomycin sulfate, and allowing the solution to stand for crystallization of dihydrostreptomycin sulfate therefrom.

8. The process for producing crystalline dihydrostreptomycin sulfate that comprises preparing an aqueous solution containing dihydrostreptomycin hydrochloride, ammonium sulfate, and methanol, and having a pH of about 4.5, adjusting the concentration of methanol in said solution to an amount merely sufficient to produce a faint turbidity in the solution, exposing the turbid solution to seed crystals of dihydrostreptomycin sulfate, and allowing the solution to stand for crystallization of dihydrostreptomycin sulfate therefrom.

9. The process for producing crystalline dihydrostreptomycin sulfate that comprises preparing an aqueous solution containing dihydrostreptomycin hydrochloride, ammonium sulfate, and methanol, and having a pH of about 4.5, adjusting the concentration of methanol in said solution to an amount merely sufficient to produce a faint turbidity in the solution, exposing the turbid solution to seed crystals of dihydrostreptomycin sulfate, allowing the solution to stand for crystallization of dihydrostreptomycin sulfate therefrom, and employing sterile conditions throughout said process thereby obtaining crystalline dihydrostreptomycin sulfate directly in a form suitable for therapeutic use.

10. The process for producing crystalline dihydrostreptomycin sulfate that comprises preparing an aqueous methanol solution containing an acid salt of dihydrostreptomycin which is more soluble than dihydrostreptomycin sulfate in said aqueous methanol, and a sulfuric acid salt selected from the group consisting of ammonium sulfate and sulfuric acid salts of alkyl and alkylol amines which are more soluble than dihydrostreptomycin sulfate in said aqueous methanol, and having a pH of about 4.5, adjusting the concentration of methanol to an amount merely sufficient to produce a faint turbidity in the solution, and allowing the solution to stand for crystallization of dihydrostreptomycin sulfate therefrom.

FRANK J. WOLF.

REFERENCES CITED

The following references are of record in the file of this patent:

UNITED STATES PATENTS

| Number | Name | Date |
|---|---|---|
| 2,446,102 | Peck | July 27, 1948 |

OTHER REFERENCES

Norris, "Experimental Organic Chemistry," sec. ed., 1924, pages 3–8, 6 pages.

Donovick et al., J. Bact., v. 53 (1947), page 207.